US010198683B2

(12) United States Patent
Sarafianos et al.

(10) Patent No.: US 10,198,683 B2
(45) Date of Patent: Feb. 5, 2019

(54) DEVICE AND METHOD FOR MANAGING THE CURRENT CONSUMPTION OF AN INTEGRATED MODULE

(71) Applicant: STMicroelectronics (Rousset) SAS, Rousset (FR)

(72) Inventors: Alexandre Sarafianos, Pourrieres (FR); Thomas Ordas, Pourcieux (FR); Yanis Linge, Fuveau (FR); Jimmy Fort, Puyloubier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 15/798,553

(22) Filed: Oct. 31, 2017

(65) Prior Publication Data
US 2018/0189624 A1 Jul. 5, 2018

(30) Foreign Application Priority Data

Jan. 3, 2017 (FR) .................................... 17 50027

(51) Int. Cl.
| G06K 19/073 | (2006.01) |
| G06F 21/75 | (2013.01) |
| G06F 21/44 | (2013.01) |
| H01L 23/00 | (2006.01) |
| H03K 19/173 | (2006.01) |
| H03K 17/693 | (2006.01) |

(52) U.S. Cl.
CPC ..... *G06K 19/07363* (2013.01); *G06F 21/445* (2013.01); *G06F 21/75* (2013.01); *G06F 21/755* (2017.08); *H01L 23/576* (2013.01); H01L 2224/48228 (2013.01)

(58) Field of Classification Search
CPC ... G06F 21/445; G06F 17/505; H01L 23/576; H03K 19/1737; H03K 17/693
USPC ........................................................ 326/113
See application file for complete search history.

(56) References Cited

U.S. PATENT DOCUMENTS

| 6,429,159 | B1 | 7/2002 | Odinak | |
| 6,848,619 | B1 * | 2/2005 | Leydier | ................ G06K 19/073 235/380 |
| 8,289,052 | B2 * | 10/2012 | Kawae | ............. H03K 19/09407 326/102 |
| 8,922,241 | B2 * | 12/2014 | Urakawa | .......... H03K 19/00369 326/33 |
| 9,342,685 | B2 | 5/2016 | Janke et al. | |
| 2002/0067201 | A1 * | 6/2002 | Butler | ................... H02M 3/073 327/536 |

(Continued)

FOREIGN PATENT DOCUMENTS

FR   2796738 A1   1/2001

*Primary Examiner* — Dylan C White
(74) *Attorney, Agent, or Firm* — Slater Matsil, LLP

(57) ABSTRACT

An electronic device randomly modifies a current profile of a logic circuit by using an auxiliary circuit. The logic circuit includes a first terminal coupled to a supply voltage terminal, a second terminal coupled to a reference voltage terminal and an output terminal configured to deliver a signal in a high state or a low state. The auxiliary circuit is coupled between the first terminal and the second terminal and is configured to randomly generate or not generate an additional current between the first terminal and the second terminal on each change of state of the signal on the output terminal.

23 Claims, 3 Drawing Sheets

(56) References Cited

U.S. PATENT DOCUMENTS

2015/0169904 A1* 6/2015 Leiserson ............ G06F 21/558
                                                            713/189

* cited by examiner

DEVICE AND METHOD FOR MANAGING THE CURRENT CONSUMPTION OF AN INTEGRATED MODULE

CROSS-REFERENCE TO RELATED APPLICATIONS

This application claims priority to French Application No. 1750027, filed on Jan. 3, 2017, which application is hereby incorporated herein by reference.

TECHNICAL FIELD

Implementations and embodiments of the invention relate to a device and method for managing the current consumption of an integrated module.

BACKGROUND

FIG. 1 illustrates a logic circuit CL of inverter type coupled between a first terminal B1, which is intended to receive a supply voltage Vdd, and a second terminal B2, which is intended to receive a reference voltage, ground GND for example here. The logic circuit conventionally comprises an input terminal E and an output terminal S.

The output terminal S may here be coupled to the input of another component of the integrated circuit CI (not shown), for example to another inverter. This coupling may generate parasitic capacitances, due for example to the gate capacitances of the transistors of the other inverter.

In FIG. 1, this parasitic capacitance has been represented by a first capacitor C1.

The logic circuit CL conventionally includes an NMOS transistor TN1 coupled in series with a PMOS transistor TP1 between the first terminal B1 and the second terminal B2. The input terminal E of the logic circuit is coupled to the gates of the two transistors, and the output terminal S is coupled to the node common to the two transistors, here the node common to the drain of the PMOS transistor TP1 and to the drain of the NMOS transistor TN1.

Thus, when the signal present on the input terminal E transitions from a high state to a low state, the PMOS transistor TP1 turns on and the NMOS transistor TN1 turns off. The capacitor C1 then charges by virtue of the current IC1 flowing through the PMOS transistor TP1. Since the charging time of the capacitor is very short, this current may be likened to a charging current peak Ic1.

In addition, the simultaneous switching of the two transistors creates, during a short time interval, a short-circuit between the terminals B1 and B2. The length of this time interval increases as the switching speed decreases. Thus, each time the transistors are switched, a short-circuit current peak Ice flows between the first terminal B1 and the second terminal B2 through the two transistors TP1 and TN1.

The current peak generated during a transition of the signal delivered by the output terminal S from a low state to a high state may have a different value to that of the current peak generated during a transition from a high state to a low state.

During a transition of the signal present on the input terminal E from a high state to a low state, the logic circuit CL consumes a current higher than the current that it consumes during a transition from a low state to a high state, since in the first case the current consumed is the sum of the current Ic1 charging the capacitor C1 and the short-circuit current and in the second case the current consumed corresponds only to the short-circuit current Ice.

Thus, by analyzing the current consumption of an integrated circuit including one or more logic gates, for example, using an electromagnetic probe and dedicated algorithms, it is possible to obtain information on the operations performed and on the data manipulated and/or on their occurrences.

It is therefore recommended to mask as much as possible the current consumption of the integrated circuit.

Solutions for masking the current consumption of an integrated circuit, such as for example the dual rail technique, which smooths the current consumption of an integrated circuit by generating a current that is complementary to the current actually consumed by the logic circuits of the circuit, already exist.

This being so, this solution is constraining since it also implies masking the current consumption of logic gates the consumption of which does not need to be masked. Moreover, this technique is costly in real estate, since it requires the number of logic gates in the integrated circuit to be doubled.

SUMMARY

Implementations and embodiments of the invention relate to integrated circuits, and especially but not exclusively those including logic circuits, and in particular to the management of the current consumption of this type of circuit in operation, for example with a view to masking this current consumption.

Thus, according to one embodiment, a technique is provided to mask the current consumption of a logic circuit incorporated into an integrated circuit using simple means allowing the masking to be focused on the logic circuit.

According to one aspect, a method is provided for managing the current consumption of a logic circuit supplied between a first terminal and a second terminal and including at least one output terminal, wherein an additional current is randomly generated or not between the first terminal and the second terminal when the signal delivered by the at least one output terminal of the logic circuit changes state.

According to another aspect, an electronic device is provided comprising at least one logic circuit that includes a first terminal intended to receive a supply voltage, a second terminal intended to receive a reference voltage, and at least one output terminal, the output terminal being configured to deliver a signal able to be in a high state or in a low state.

This device comprises at least one auxiliary circuit coupled between the first terminal and the second terminal and configured to randomly generate or not-generate an additional current between the first terminal and the second terminal on each change of state of the signal on the output terminal.

Thus, the current consumption of the logic circuit is masked by the random generation of an additional current, which may be likened to noise, and it is more difficult to deduce the operations performed by the logic circuit by analyzing its current consumption. An integrated circuit that incorporates such a logic circuit may thus for example be protected from side-channel analysis.

In addition, by coupling the auxiliary module to the logic circuit, there is no need to mask the whole of the current consumption of the integrated circuit. In particular it is possible to produce an integrated circuit including a plurality of logic circuits in which only certain logic circuits are coupled to an auxiliary module, and therefore have a masked current consumption.

According to one variant embodiment, this logic circuit includes at least one input terminal, and the auxiliary circuit includes an auxiliary input terminal configured to receive a pseudorandom signal and comprises a first auxiliary transistor the control electrode of which is coupled to the auxiliary input terminal and a first electrode of which is coupled to the first terminal, at least one second auxiliary transistor the control electrode of which is coupled to the output of the logic circuit, and at least one intermediate transistor coupled between the first auxiliary transistor and the at least one second auxiliary transistor and the control electrode of which is coupled to the at least one input.

For example, the at least one logic circuit may be an inverter.

According to another variant embodiment applicable to a logic circuit including a plurality of inputs, the auxiliary circuit includes a plurality of intermediate transistors, each intermediate transistor having its gate coupled to a separate input of the logic circuit.

Thus the device is compatible with various types of logic circuit.

The intermediate transistors may be connected in series between the first auxiliary transistor and the second auxiliary transistor.

The at least one logic circuit may include a NAND logic gate, and the auxiliary circuit then includes a first intermediate transistor the control electrode of which is coupled to a first input terminal of the NAND gate and a second intermediate transistor the control electrode of which is coupled to a second input terminal of the NAND gate, the first auxiliary transistor, the second auxiliary transistor, the first intermediate transistor and the second intermediate transistor being mounted in series between the first terminal and second terminal.

The auxiliary circuit may comprise a third auxiliary transistor the control electrode of which is coupled to the auxiliary input terminal, and the intermediate transistors have a mutually coupled first electrode and are coupled in series with the first and third auxiliary transistors, respectively.

According to another embodiment, the at least one logic circuit includes a NOR gate, and the device includes the first intermediate transistor connected in series with the first auxiliary transistor and the control electrode of which is coupled to a first input of the NOR gate, a second intermediate transistor the control electrode of which is coupled to a second input of the NOR gate and mounted in series with the third auxiliary transistor the control electrode of which is coupled to the pseudorandom signal generator, the first auxiliary transistor and the first intermediate transistor being connected in parallel with the third auxiliary transistor and the second intermediate transistor between the supply terminal and the first intermediate transistor.

The device may comprise a plurality of connected modules.

According to another aspect, an integrated circuit is provided comprising a device such as described above.

According to another aspect, a system is provided comprising at least one integrated circuit, the system possibly for example forming a chip card or a computational machine.

The first auxiliary transistor and the third auxiliary transistor may be PMOS transistors, and the second transistor and the intermediate transistors may be NMOS transistors.

According to another aspect, a system is provided comprising an integrated circuit, the system possibly being a chip card or a computational machine.

BRIEF DESCRIPTION OF THE DRAWINGS

Other advantages and features of the invention will become apparent on examining the detailed description of implementations and embodiments of the invention, which implementations and embodiments are in no way limiting, and the appended drawings, in which.

DETAILED DESCRIPTION OF ILLUSTRATIVE EMBODIMENTS

Figure 2:
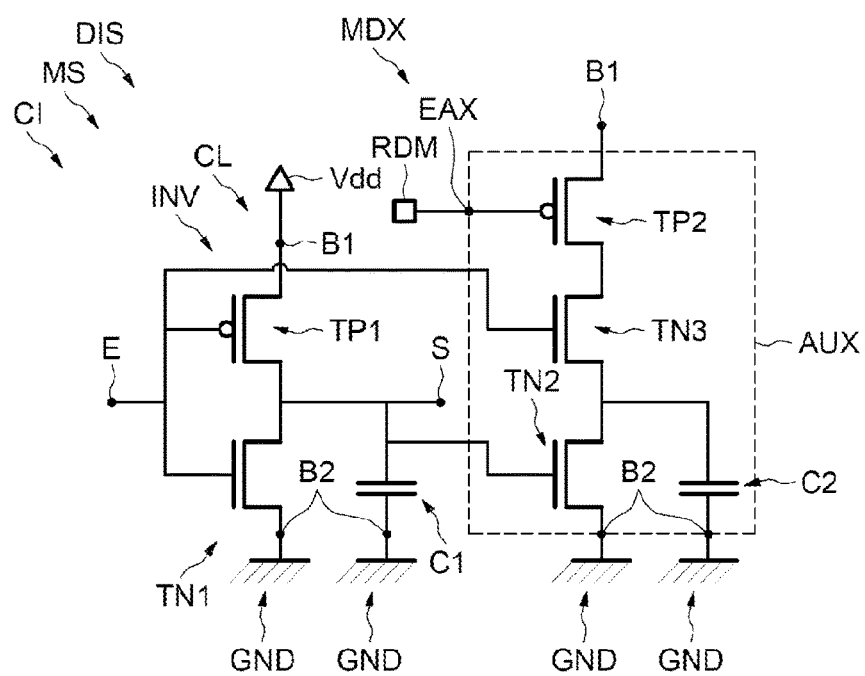
FIGS. 2 to 8 illustrate implementations and embodiments of the invention.

FIG. 2 schematically illustrates from an electrical point of view an integrated circuit CI including an electronic device incorporating a module MS containing a logic circuit CL including an input terminal E and an output terminal S and coupled to an auxiliary module MDX.

The logic circuit CL and the auxiliary module MDX are both coupled between a first terminal B1 intended to receive a supply voltage Vdd, and a second terminal B2 intended to receive a reference voltage, ground GND for example here.

The logic circuit CL is here an inverter INV that conventionally includes a first PMOS transistor TP1 and a first NMOS transistor TN2 that are mounted in series between the first terminal B1 and the second terminal B2.

The inverter INV includes the input terminal E, which is coupled to the gate of the first PMOS transistor TP1 and to the gate of the first NMOS transistor TN1, and the output terminal S, which is coupled between the first NMOS transistor TN1 and the first PMOS transistor TP1.

Figure 1:
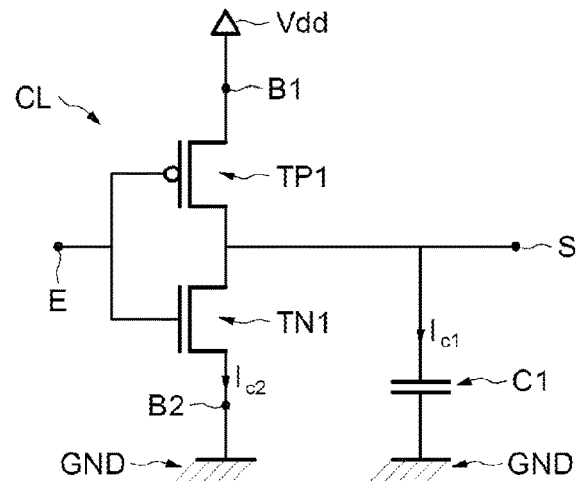
FIG. 1, which was described above, illustrates a conventional inverter logic circuit.

The output terminal S may here be coupled to the input of another component of the integrated circuit CI (not shown), for example to another inverter. This coupling may generate parasitic capacitances, due in particular to the gate capacitance of the other inverter. In FIG. 1, this parasitic capacitance has been represented by a first capacitor C1.

The auxiliary module MDX includes an auxiliary circuit AUX including an auxiliary input EAX, and a pseudorandom signal generator RDM coupled to the auxiliary input EAX of the auxiliary circuit AUX.

The pseudorandom signal generator RDM, which is of conventional structure known per se, is configured to generate a signal that may randomly be in a high state or in a low state. This generator RDM may be specific to the module MS, or be common to other modules of the integrated circuit.

The auxiliary circuit AUX here includes a first auxiliary transistor TP2, here a PMOS transistor, and a second auxiliary transistor TN2, here an NMOS transistor, which are coupled in series between the first terminal B1 and the second terminal B2.

A first intermediate transistor TN3, here an NMOS transistor, is coupled between the first auxiliary transistor TP2 and the second auxiliary transistor TN2.

The gate of the first intermediate transistor TN3 is coupled to the input terminal E of the inverter INV, and the gate of the second auxiliary transistor TN2 is coupled to the output terminal S of the inverter INV.

The gate of the first auxiliary transistor TP2 forms the auxiliary input EAX and is therefore coupled to the pseudorandom signal generator RDM.

The auxiliary circuit AUX is here coupled to another module of the integrated circuit CI, for example to an inverter (not shown), and this coupling may generate a parasitic capacitance that has been represented in FIG. 2 by a second capacitor C2.

Initially, the input terminal E of the integrated circuit receives a signal in the high state, for example a voltage of 3 V; therefore, the first PMOS transistor TP1 is turned off and the first NMOS transistor TN1 is turned on.

The output terminal S then delivers a signal in the low state, for example a zero voltage. The second auxiliary transistor TN2 is therefore in an off state.

Furthermore, since the first intermediate transistor TN3 is coupled to the input terminal E, it is in an on state.

On a first transition, i.e., when the signal on the input E passes to a low state, the first PMOS transistor TP1 passes to an on state and the first NMOS transistor TN1 passes to an off state. The signal delivered by the output terminal S therefore passes from a low state to a high state.

The first capacitor C1 then charges by virtue of the flow of a first charging current peak flowing between the first terminal B1 and ground GND, through the first PMOS transistor TP1 and the first capacitor C1.

Furthermore, simultaneously switching the first NMOS transistor TN1 and the first PMOS transistor TP1 causes a first short-circuit current peak to flow, between the first terminal B1 and the second terminal B2, through the first PMOS transistor TP1 and the first NMOS transistor TN1.

On a second transition, i.e. when the signal on the input terminal E passes back to a high state, the first PMOS transistor TP1 passes to an off state and the first NMOS transistor TN1 passes to an on state. The signal delivered by the output terminal S then passes from a high state to a low state.

The first capacitor C1 then discharges through the first NMOS transistor TN1.

Again, simultaneously switching the first NMOS transistor TN1 and the first PMOS transistor TP1 causes a second short-circuit current peak to flow, between the first terminal B1 and the second terminal B2, through the first PMOS transistor TP1 and the first NMOS transistor TN1.

Thus, during the first transition, the logic circuit CL consumes a current equal to the sum of the first charging current peak and the first short-circuit current peak, and during the second transition, the logic circuit CL consumes a lower current, equal to the second short-circuit current peak.

During a side-channel analysis, this difference in consumption allows the behavior of the circuit to be analyzed, in the absence of the auxiliary circuit AUX.

The presence of this auxiliary circuit allows the consumption of the logic circuit CL to be masked, as will now be explained.

During the second transition, since the first intermediate transistor TN3 is coupled to the input terminal E, it passes to an on state.

The second auxiliary transistor TN2, the gate of which is coupled to the output terminal S, passes to an off state.

Since the gate of the first auxiliary transistor TP2 is coupled to the pseudorandom signal generator RDM, the first auxiliary transistor TP2 may either change state if the signal generated by the generator RDM changes state, for example passing from a high state to a low state or from a low state to a high state, or preserve its state if the signal generated by the generator RDM does not change state.

Furthermore, if the first auxiliary transistor TP2 changes state, then the simultaneous switching of the first auxiliary transistor TP2, the second auxiliary transistor TN2 and the first intermediate transistor TN3 causes a third current peak to flow between the first terminal B1 and the second terminal B2, through these three transistors.

If this change of state corresponds to passage from the off state to the on state, then a second charging current peak flows between the first terminal B1 and ground so as to charge the second capacitor C2.

If the signal delivered by the pseudorandom signal generator preserves a high state, then the first auxiliary transistor TP2 was in an off state and remains in an off state, and no current peak flows through the auxiliary circuit AUX.

If the signal delivered by the pseudorandom signal generator RDM preserves a low state, then the first auxiliary transistor TP2 preserves its on state, and the simultaneous switching of the second auxiliary transistor TN2 and the first intermediate transistor TN3 generates a fourth short-circuit current peak between the first terminal B1 and the second terminal B2.

Thus, during the second transition, i.e. when the signal delivered by the output terminal S passes from a high state to a low state, the following are randomly generated:

a current peak equal to the sum of the second charging current peak and the third short-circuit current peak;

the fourth current peak; or no current peak.

The current consumption of the logic circuit CL is therefore masked, and it is more difficult for an outside attacker to determine the nature of the operations performed by the module MS of the circuit CI by studying current consumption.

During the first transition, i.e. when the signal delivered on the output terminal S passes from a low state to a high state, only short-circuit current peaks are generated by the auxiliary circuit AUX.

The embodiment of the invention described above is compatible with sequential logic circuits. In particular, FIG. 3 illustrates a latch LT1 including two modules MS1 and MS2 having a structure analogous to that described above with reference to FIG. 2.

The first module MS1 and the second module MS2 each respectively include an input E1 and E2 and an auxiliary input EAX1 and EAX2.

Figure 3:
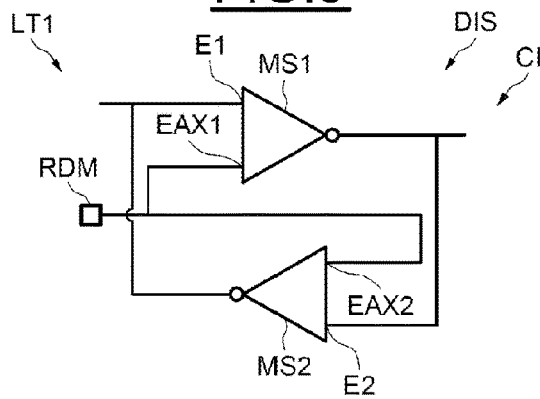

In FIG. 3, each module MS1, MS2 is represented by a conventional inverter symbol comprising an auxiliary input EAX1 and EAX2 coupled to the pseudorandom signal generator RDM common to the two inverters.

Figure 4:
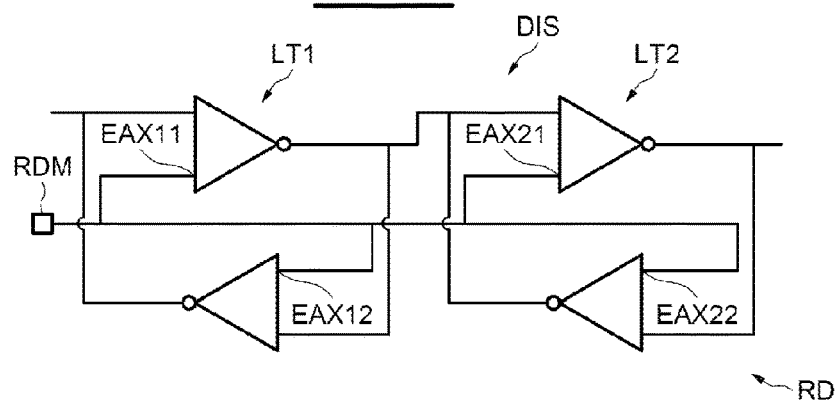

As illustrated in FIG. 4, it is also possible to couple a plurality of latches LT1, LT2 in series so as to form a shift register RD, while preserving a single common pseudorandom signal generator connected to the inputs EAX11, EAX12, EAX21 and EAX22, or using a different pseudorandom signal generator for each input.

It is also possible to use a parallel pseudorandom generator to generate a number of bits respectively assigned to the various latches so as to further increase the complexity of the noise.

Figure 5:
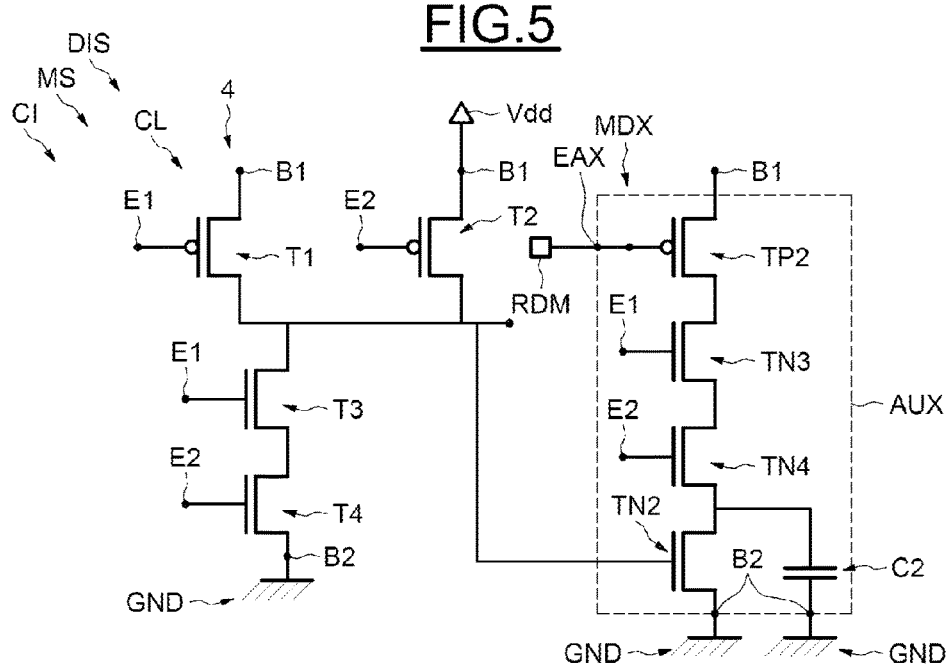

FIG. 5 illustrates one embodiment, in which the logic circuit CL is a NAND gate 4, including a first input terminal E1 and a second input terminal E2.

The NAND gate 4 conventionally includes two PMOS transistors T1 and T2 that are coupled in parallel, the pair of transistors T1 and T2 being mounted in series with two NMOS transistors T3 and T4 between the first terminal B1 and the second terminal B2.

Each of the input terminals E1 and E2 is coupled to the gate of one of the PMOS transistors T1 and T2 and to the gate of one of the NMOS transistors T3 and T4.

The auxiliary circuit AUX is modified with respect to the preceding embodiment so as to comprise a second intermediate transistor TN4 coupled between the first intermediate transistor TN3 and the second auxiliary transistor TN2.

The gate of the first intermediate transistor TN3 is coupled to the first input terminal E1, and the gate of the second intermediate transistor TN4 is coupled to the second input terminal E2.

Thus, during a transition of the signal present on the output terminal S, i.e. when the pair of signals on the pair of input terminals E1-E2 passes from a low-low, low-high, or high-low state to a high-high state, or vice versa, then the first intermediate transistor TN3, the second intermediate transistor TN4 and the second auxiliary transistor TN2 change state.

Furthermore, if the first auxiliary transistor TP2, via the pseudorandom signal generator RDM, changes state, or if it preserves an on state, a current peak flows between the first terminal B1 and the second terminal B2. The size of this current peak depends on the nature of the way in which the transistors of the auxiliary circuit AUX are switched.

More particularly, when the pair of signals on the pair of input terminals E1-E2 passes from a low-low, low-high or high-low state to a high-high state, and if the first auxiliary transistor TP2, via the pseudorandom signal generator RDM, passes from a low state to a high state, then a charging current peak flows between the first terminal B1 and ground so as to charge the second capacitor C2.

Thus during certain transitions only, and therefore randomly, a noise signal is generated making it more difficult to determine the operations performed.

Figure 6:
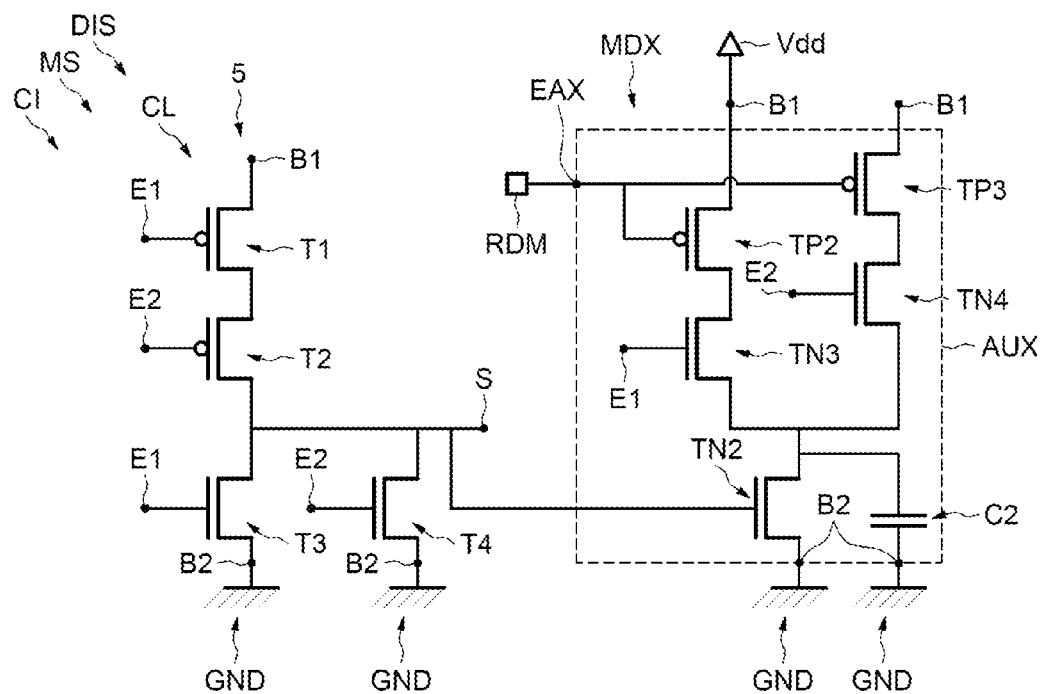

FIG. 6 illustrates one embodiment of the invention in which the logic circuit CL is a NOR gate 5 including the first input terminal E1 and a second input terminal E2.

The NOR gate 5 conventionally differs from the NAND gate 4 of FIG. 5 in that the two PMOS transistors T1 and T2 are coupled in series and the two NMOS transistors T3 and T4 are coupled in parallel, the two transistor pairs T1-T2 and T3-T4 being coupled in series to each other.

In this embodiment, the auxiliary circuit AUX is modified with respect to the embodiment described above with reference to FIG. 4 so that a third auxiliary transistor TP3, here a PMOS transistor, and the second intermediate transistor TN4 are mounted in series between the first terminal B1 and the second NMOS transistor TN2, and so as to be mounted in parallel with the first auxiliary transistor TP2 and the first intermediate transistor TN3.

The gate of the first auxiliary transistor TP2 and the gate of the third auxiliary transistor TP3 are coupled to the pseudorandom signal generator RDM.

The gate of the first intermediate transistor TN3 is coupled to the first input terminal E1 and the gate of the second intermediate transistor TN4 is coupled to the second input terminal E2.

Thus, during a transition of the signal on the output terminal S of the NOR gate 5, i.e. a transition of the pair of signals on the pair of inputs E1-E2 from a low-low state to a low-high, high-low or high-high state, or vice versa, then the first intermediate transistor TN3 and/or the second intermediate transistor TN4 change state.

Furthermore, if the first auxiliary transistor TP2 and the third auxiliary transistor TP3, via the pseudorandom signal generator RDM, change state, or if they preserve an on state, a current peak flows between the first terminal B1 and the second terminal B2.

More particularly, during a transition of the pair of signals on the pair of inputs E1-E2 from a low-low state to a low-high, high-low or high-high state, and if the first auxiliary transistor TP2 and the third auxiliary transistor TP3 pass from an off state to an on state, then a charging current peak flows between the terminal B1 and ground GND, so as to charge the second capacitor C2.

The integrated electronic circuit CI described above and illustrated in FIGS. 2 to 6 may conventionally be integrated into a system comprising a processing unit, conventionally into a processing unit of a chip card, a computer, or a mobile phone terminal, which require secure operations to be implemented.

Figure 7:
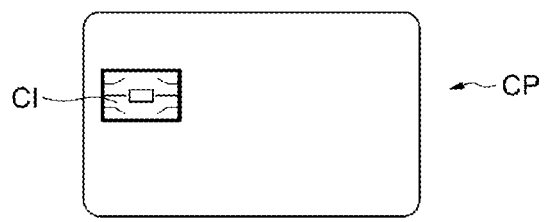
Figure 8:
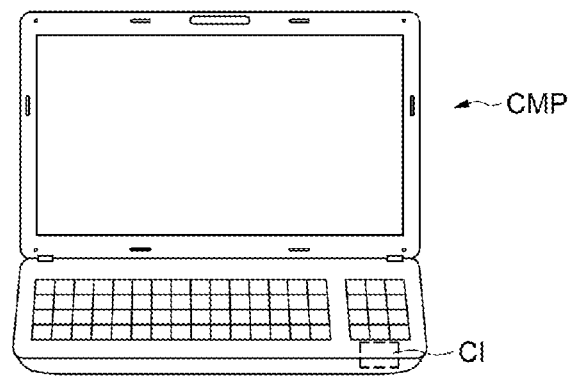

FIGS. 7 and 8 illustrate computational systems including secure processing units in which integrated circuits CI according to one embodiment of the invention are incorporated. FIG. 7 illustrates a chip card CP and FIG. 8 illustrates a laptop computer CMP. The chip card CP and the laptop computer CMP for example include a microprocessor including an integrated circuit according to one embodiment of the invention.

What is claimed is:

1. An electronic device comprising:
   a logic circuit that includes an input terminal, a first terminal coupled to a supply voltage terminal, a second terminal coupled to a reference voltage terminal, and an output terminal configured to deliver a signal in a high state or a low state; and
   an auxiliary circuit coupled between the first terminal and the second terminal, wherein the auxiliary circuit comprises:
      an auxiliary input terminal configured to receive a pseudorandom signal;
      a first auxiliary transistor having a control electrode coupled to the auxiliary input terminal and a first electrode coupled to the first terminal;
      a second auxiliary transistor having a control electrode coupled to the output terminal; and
      an intermediate transistor coupled between the first auxiliary transistor and the second auxiliary transistor, the intermediate transistor having a control electrode coupled to the input terminal.

2. The device according to claim 1, wherein the first auxiliary transistor is a PMOS transistor, and the second auxiliary transistor and the intermediate transistor are NMOS transistors.

3. The device according to claim 1, wherein the logic circuit comprises an inverter.

4. The device according to claim 1, wherein the logic circuit includes a plurality of inputs and the auxiliary circuit includes a plurality of intermediate transistors, each intermediate transistor having a control terminal coupled to a separate input of the logic circuit.

5. The device according to claim 4, wherein the intermediate transistors are connected in series between the first auxiliary transistor and the second auxiliary transistor.

6. The device according to claim 5, wherein the logic circuit comprises a NAND gate, and the auxiliary circuit comprises a first intermediate transistor having a control electrode coupled to a first input terminal of the NAND gate and a second intermediate transistor having a control electrode coupled to a second input terminal of the NAND gate, the first auxiliary transistor, the second auxiliary transistor, the first intermediate transistor and the second intermediate transistor being connected in series between the first terminal and the second terminal.

7. The device according to claim 4, wherein the auxiliary circuit comprises a third auxiliary transistor having a control electrode coupled to the auxiliary input terminal, and wherein the intermediate transistors have a mutually coupled first electrode and are coupled in series with the first and third auxiliary transistors, respectively.

8. The device according to claim 7, wherein the logic circuit comprises a NOR gate and the auxiliary circuit comprises:
  a first intermediate transistor connected in series with the first auxiliary transistor, the first intermediate transistor having a control electrode coupled to a first input of the NOR gate;
  a second intermediate transistor connected in series with the third auxiliary transistor, the second intermediate transistor having a control electrode coupled to a second input of the NOR gate;
  wherein a control electrode of the third auxiliary transistor is coupled to the auxiliary input terminal; and
  wherein the first auxiliary transistor and the first intermediate transistor are arranged in parallel with the third auxiliary transistor and the second intermediate transistor between the supply voltage terminal and the first intermediate transistor.

9. The device according to claim 1, wherein the device includes a first module that includes the logic circuit and the auxiliary circuit, the device further including a second module connected to the first module.

10. The device according to claim 1, wherein the logic circuit and the auxiliary circuit are formed in a single integrated circuit.

11. The device according to claim 1, wherein the device is part of a chip card.

12. The device according to claim 1, wherein the device is part of a computational machine.

13. The device according to claim 1, wherein the auxiliary circuit is configured to randomly generate an additional current between the first terminal and the second terminal on each change of state of the signal on the output terminal.

14. An electronic device comprising:
  an input terminal coupled to receive a logic signal;
  an auxiliary input terminal configured to receive a pseudorandom signal;
  a supply voltage terminal;
  a reference voltage terminal;
  an output terminal configured to deliver a signal in a high state or a low state;
  a logic circuit coupled between the supply voltage terminal and the reference voltage terminal, the logic circuit having an input coupled to the input terminal and an output coupled to the output terminal, the output configured to deliver a signal in a high state or a low state;
  a first auxiliary transistor having a control electrode coupled to the auxiliary input terminal and a first electrode coupled to the supply voltage terminal;
  a second auxiliary transistor having a control electrode coupled to the output terminal; and
  an intermediate transistor coupled between the first auxiliary transistor and the second auxiliary transistor, the intermediate transistor having a control electrode coupled to the input terminal.

15. The device according to claim 14, wherein the first auxiliary transistor is a PMOS transistor, and the second auxiliary transistor and the intermediate transistor are NMOS transistors.

16. The device according to claim 14, wherein the logic circuit comprises an inverter.

17. The device according to claim 14, wherein the logic circuit comprises a NAND gate;
  wherein the intermediate transistor is a first intermediate transistor having a control electrode coupled to a first input terminal of the NAND gate;
  wherein the device further comprises a second intermediate transistor having a control electrode coupled to a second input terminal of the NAND gate; and
  wherein the first auxiliary transistor, the second auxiliary transistor, the first intermediate transistor and the second intermediate transistor are connected in series between the supply voltage terminal and the reference voltage terminal.

18. The device according to claim 14, wherein the logic circuit includes a plurality of inputs and wherein the device includes a plurality of intermediate transistors, each intermediate transistor having a control terminal coupled to a separate input of the logic circuit.

19. The device according to claim 18, wherein the intermediate transistors are connected in series between the first auxiliary transistor and the second auxiliary transistor.

20. The device according to claim 18, further comprising a third auxiliary transistor having a control electrode coupled to the auxiliary input terminal, wherein the intermediate transistors have a mutually coupled first electrode and are coupled in series with the first and third auxiliary transistors, respectively.

21. The device according to claim 14, further comprising a third auxiliary transistor having a control electrode coupled to the auxiliary input terminal;
  wherein the logic circuit comprises a NOR gate:
  wherein the intermediate transistor comprises a first intermediate transistor connected in series with the first auxiliary transistor, the first intermediate transistor having a control electrode coupled to a first input of the NOR gate;
  the device further comprises a second intermediate transistor connected in series with the third auxiliary transistor, the second intermediate transistor having a control electrode coupled to a second input of the NOR gate;
  wherein a control electrode of the third auxiliary transistor is coupled to the auxiliary input terminal; and
  wherein the first auxiliary transistor and the first intermediate transistor are arranged in parallel with the third auxiliary transistor and the second intermediate transistor between the supply voltage terminal and the first intermediate transistor.

22. An electronic device comprising:
  a logic circuit that includes an input terminal, a first terminal coupled to a supply voltage terminal, a second terminal coupled to a reference voltage terminal, and an output terminal configured to deliver a signal in a high state or a low state; and
  auxiliary means for randomly generating or not generating an additional current between the first terminal and the second terminal when the signal at output terminal of the logic circuit changes state, wherein the auxiliary means comprises:
    an auxiliary input terminal configured to receive a pseudorandom signal;
    a first auxiliary transistor having a control electrode coupled to the auxiliary input terminal and a first electrode coupled to the first terminal;
    a second auxiliary transistor having a control electrode coupled to the output terminal; and
    an intermediate transistor coupled between the first auxiliary transistor and the second auxiliary transistor, the intermediate transistor having a control electrode coupled to the input terminal.

23. A method for managing current consumption of a logic circuit supplied between a first terminal and a second terminal and including an output terminal, the method comprising:
   receiving an input at an input terminal to initiate a change in state of a signal at the output terminal;
   receiving a pseudorandom signal with a control terminal of a first auxiliary transistor; and
   randomly generating or not generating an additional current between the first terminal and the second terminal when the signal at output terminal of the logic circuit changes state by using an auxiliary circuit that comprises:
      the first auxiliary transistor;
      a second auxiliary transistor having a control electrode coupled to the output terminal; and
      an intermediate transistor coupled between the first auxiliary transistor and the second auxiliary transistor, the intermediate transistor having a control electrode coupled to the input terminal.

* * * * *